(12) United States Patent
Kitazawa

(10) Patent No.: US 7,362,464 B2
(45) Date of Patent: Apr. 22, 2008

(54) PRINTING APPARATUS

(75) Inventor: Toshio Kitazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 840 days.

(21) Appl. No.: 09/974,838

(22) Filed: Oct. 12, 2001

(65) Prior Publication Data
US 2002/0044301 A1 Apr. 18, 2002

(30) Foreign Application Priority Data
Oct. 16, 2000 (JP) ............................ 2000-315974

(51) Int. Cl.
*G06F 15/00* (2006.01)

(52) U.S. Cl. .................. 358/1.16; 358/1.12; 358/1.14; 358/1.15; 345/522; 345/531; 710/15; 710/18; 710/19; 715/764

(58) Field of Classification Search .............. 358/1.16; 345/522, 531, 440; 715/764; 710/15, 18, 710/19
See application file for complete search history.

(56) References Cited

U.S. PATENT DOCUMENTS

| | | | |
|---|---|---|---|
| 5,706,411 A * | 1/1998 | McCormick et al. | 358/1.14 |
| 5,805,166 A * | 9/1998 | Hall et al. | 715/839 |
| 6,292,267 B1 * | 9/2001 | Mori et al. | 358/1.15 |
| 6,347,202 B1 * | 2/2002 | Shishizuka et al. | 399/75 |
| 6,373,585 B1 * | 4/2002 | Mastie et al. | 358/1.15 |
| 6,486,968 B2 * | 11/2002 | Nishikawa | 358/1.15 |
| 6,678,068 B1 * | 1/2004 | Richter et al. | 358/1.15 |
| 6,738,080 B1 * | 5/2004 | Dash et al. | 715/764 |
| 6,850,995 B1 * | 2/2005 | Shishizuka et al. | 710/20 |
| 2001/0052995 A1 * | 12/2001 | Idehara | 358/1.15 |
| 2002/0044301 A1 | 4/2002 | Kitazawa | |

FOREIGN PATENT DOCUMENTS

| | | |
|---|---|---|
| JP | 5-155115 | 6/1993 |
| JP | 7-210345 | 8/1995 |
| JP | 10-28196 | 1/1998 |

OTHER PUBLICATIONS

Canon imageRUNNER 5000 Series User's Guide, Canon Inc., 2000, pp. 5-13 through 5-27.*
U.S. Appl. No. 11/616,663, filed Dec. 27, 2006, Igarashi et al.

* cited by examiner

*Primary Examiner*—Twyler Lamb Haskins
*Assistant Examiner*—Mark R. Milia
(74) *Attorney, Agent, or Firm*—Oblon, Spivak, McClelland, Maier & Neustadt, P.C.

(57) ABSTRACT

A printing apparatus includes an image data input means for receiving input data, image data processing means for processing the image data and drawing the image data in an image memory unit, printing means for forming an image on a transfer sheet using the image data drawn in the image memory unit, and display means for displaying, either dynamically or successively, which process the image data is undergoing at any given moment, beginning with image data reception and ending with image data printing.

19 Claims, 8 Drawing Sheets

FIG.6

| NO. | STATUS | NO. OF PAGES | NAME OF DOCUMENT | DATE AND TIME SAVED |
|---|---|---|---|---|
| 1 | PRINTING | 13 | AGENDA MAY 29, 2000 | 2000/05/29 10:23:15 |
| 2 | WAITING | 1 | MARKET SURVEY REPORT- COVER- | 2000/05/29 10:24:03 |
| 3 | WAITING | 25 | MARKET SURVEY REPORT- TEXT- | 2000/05/29 10:24:04 |
| 4 | DRAWING | 6 | FIG.2 | 2000/05/29 10:26:32 |
| 5 | SAVING | — | — | 2000/05/29 10:27:51 |
| 6 | | | | |
| 7 | | | | |
| 8 | | | | |

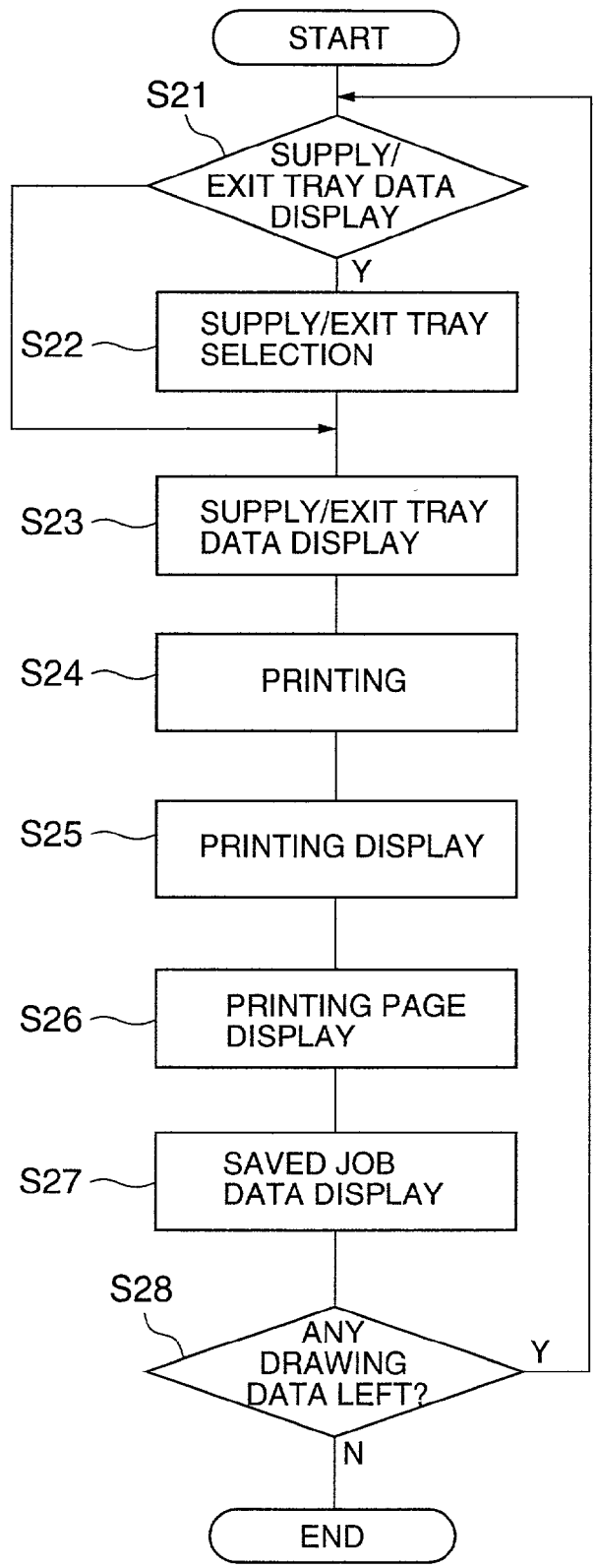

PRINTING APPARATUS

BACKGROUND OF THE INVENTION

1. Field of the Invention

The present invention relates to a printing apparatus, and more precisely, to a printing apparatus for printers, digital copiers and facsimile machines.

2. Description of the Related Art

In the conventional printing apparatus for printers and the like, the state or status of the printing apparatus has been indicated by simple messages and the like displayed by a plurality of light emitting diodes and liquid crystal display units. Nevertheless, in general, the state of the printing apparatus has been difficult to ascertain. For example, it has been difficult to know whether the printer is operating normally and simply taking a fair amount of processing time, or whether some trouble has occurred and the printer has stopped.

In the case of an error occurring, an LED or a message to that effect is displayed, so it is possible to understand what is going on with the printing apparatus. However, in a case in which the printing apparatus is operating normally but is taking time, it is not possible to tell the status of the printing apparatus merely from looking at the printing apparatus or its indicators.

In particular, where the LED state has changed but no message is displayed, it is not always possible to ascertain what that LED is indicating, thus increasing the uncertainty as to what is happening.

Similarly, when the supply tray or the exit tray has been automatically selected, it has been difficult to tell where sheets are being supplied from and where they are being exited to.

In order to redress these disadvantages and to improve the status display, there is, for example, the display apparatus disclosed by Japanese Laid-Open Patent Application No. 5-155115, which displays a ready status when no task is being executed in the printer.

Similarly, Japanese Laid-Open Patent Application No. 7-210345 discloses a method that makes it possible to display, confirm and change the status of individual printers connected in a network and the queues and print jobs assigned to these printers on a screen using a graphical user interface (GUI).

Further, a display apparatus that enables users to search instantly for and to display status information on a desired print job is disclosed in Japanese Laid-Open Patent Application No. 10-28196.

However, the above-described conventional solutions do not adequately address the drawbacks of the conventional art. Specifically, the status of print jobs is displayed merely in such general terms as "waiting" or "printing", and accordingly, in a case in which, for example, "printing" is displayed and such display does not change for a long time, it is impossible to know whether the printing apparatus is merely taking a long time or some trouble has occurred and the printing apparatus is stopped, thus heightening the uncertainty for the user.

Additionally, in the conventional art it has been necessary to carry out a number of operations in order to obtain a status display, which is inconvenient.

SUMMARY OF THE INVENTION

Accordingly, it is an object of the present invention to provide a printing apparatus in which the above-described drawbacks of the conventional art are eliminated, that is, to provide a printing apparatus that displays the operation of the printing apparatus during their execution in a manner that is easy for the user to understand.

Another object of the present invention is to provide a printing apparatus that displays which supply tray has been selected when a plurality of supply trays is automatically selected, in a manner that is easy for the user to understand.

The above-described objects of the present invention are achieved by a printing apparatus comprising:

image data input means for receiving input data;

image data processing means for processing the image data and drawing the image data in an image memory unit;

printing means for forming an image on a transfer sheet using the image data drawn in the image memory unit; and display means for displaying, either dynamically or successively, which process the image data is undergoing at any given moment, from image data reception to image data printing.

Additionally, the above-described objects of the present invention are also achieved by the printing apparatus as described above, wherein the display means comprises a spooling display component indicating dynamically that the image data is in the process of being received by the printing apparatus.

Additionally, the above-described objects of the present invention are also achieved by the printing apparatus as described above, wherein the display means comprises a drawing display component indicating dynamically that the image data is in the process of being drawn in the image memory unit of the printing apparatus.

Additionally, the above-described objects of the present invention are also achieved by the printing apparatus as described above, wherein the display means comprises a printing display component indicating dynamically that the image data is in the process of being printed by the printing apparatus.

Additionally, the above-described objects of the present invention are also achieved by the printing apparatus as described above, wherein the display means comprises a spool data display component indicating successively an amount of unprocessed image data not yet drawn in the image memory unit from among that image data which has been received by the printing apparatus.

Additionally, the above-described objects of the present invention are also achieved by the printing apparatus as described above, wherein the display means comprises a spool data display component displays the amount of unprocessed image data on a per-print-job basis.

Additionally, the above-described objects of the present invention are also achieved by the printing apparatus as described above, wherein the display means comprises a drawing page display component displaying page contents of image data in the process of being drawn in the image memory component of the printing apparatus.

Additionally, the above-described objects of the present invention are also achieved by the printing apparatus as described above, wherein the display means comprises a printed page display component displaying page contents of image data in the process of being printed by the printing apparatus.

Additionally, the above-described objects of the present invention are also achieved by the printing apparatus as described above, wherein the display means comprises a saved job display component that displays a list of print jobs stored in the image memory component of the printing apparatus.

Additionally, the above-described objects of the present invention are also achieved by the printing apparatus as described above, further comprising a selectable plurality of supply trays containing transfer sheets ready to be sent to the printing means, wherein the display means comprises a supply tray display component that displays a message indicating a selected one of the supply trays.

Additionally, the above-described objects of the present invention are also achieved by the printing apparatus as described above, further comprising a selectable plurality of exit trays for receiving printed transfer sheets exited from the printing means, wherein the display means comprises an exit tray display component that displays a message indicating a selected one of the exits trays.

According to the above-described aspects of the present invention, the state of operation of the printing apparatus and the present status of print jobs can be displayed in real time, allowing the user to obtain an accurate understanding of the state of the printing apparatus and eliminating uncertainty over whether the apparatus is functioning properly or not.

Additionally, the above-described aspects of the present invention provide the following advantages.

The animated display provided by the individual indicators for spooling, drawing and printing provide the user with a direct, easy-to-understand way of ascertaining the operating status of the printing apparatus. The display of the amount of unprocessed data aids the user in determining whether or not to input the next print job, and provides a benchmark for adjusting the amount of RAM used for spooling. Displaying in real time the contents of pages in the process of being drawn or printed makes stop commands easier to issue. Moreover, displaying a list of jobs in process together with the number of pages aids in predicting when a desired job will be printed. Also, displaying the location of the supply and exit trays aids in re-supplying the supply tray and in determining where the completed print exits the apparatus.

These and other objects, features, aspects and advantages of the present invention will become better understood and more apparent from the following description, appended claims and accompanying drawings.

BRIEF DESCRIPTION OF THE DRAWINGS

FIG. 6 is a diagram showing a sample stored job data display of the display portion;

FIG. 11 is a flow chart showing an operation of the printing apparatus of the present invention during a print process.

DESCRIPTION OF THE PREFERRED EMBODIMENTS

A description will now be given of preferred embodiments of the present invention, with reference to the accompanying drawings. It should be noted that identical or corresponding elements are given identical or corresponding reference numbers in all drawings, with detailed descriptions thereof given once and thereafter omitted.

Figure 1:
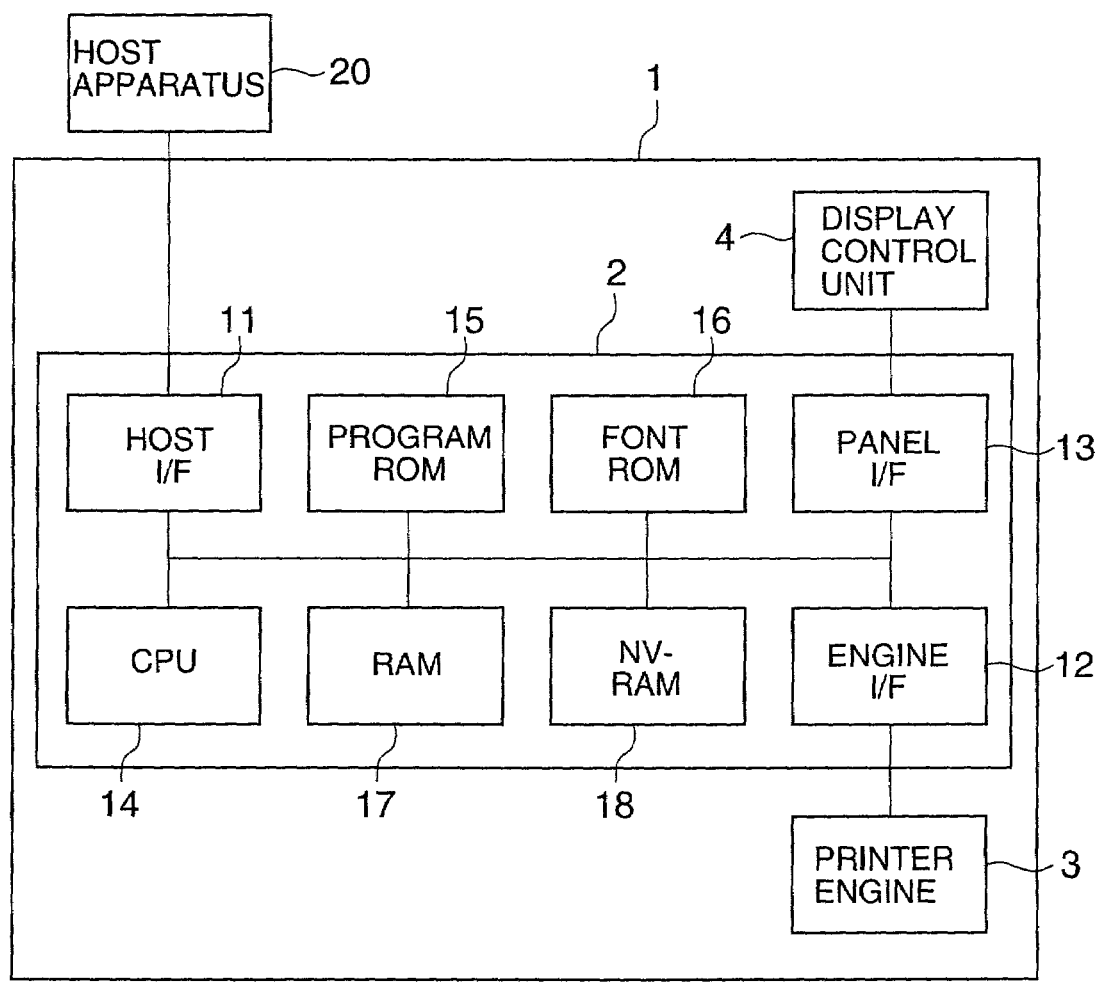
FIG. 1 is a block diagram illustrating a configuration of a printer apparatus according to one embodiment of the present invention.

FIG. 1 is a block diagram illustrating a configuration of a printer apparatus according to one embodiment of the present invention. As shown in FIG. 1, the printing apparatus may be a laser printer 1.

The laser printer 1 comprises a controller 2, a printer engine 3 and a display/control unit 4. The controller 2 is an apparatus that converts image data from a host apparatus 20 to bit map data (drawing data) and outputs the converted data to the printer engine 3 according to a set control mode and a control code from the host computer 20, and is composed of the following components, namely: a host interface (hereinafter I/F) 11, an engine I/F 12, a panel I/F 13, a CPU 14, a program ROM 15, a font ROM 16, RAM 17 and NVRAM (nonvolatile RAM) 18.

The host I/F 11 receives control codes and image data sent from the host apparatus 20 such as a personal computer and the like and also transmits status signals indicating the status of the printer to the host 20, and together with the connecting host apparatus 20 selects from a variety of parallel I/F or serial I/F.

The engine I/F 12 transmits commands and drawing data to the printer engine 3, and receives status signals from the printer engine 3.

The panel I/F 13 transmits display control data to the display/control unit 4 and receives individual key data.

The CPU 14 is the central processing unit, and operates by a control program stored in the program ROM 15 so as to process control codes and image data from the host apparatus 20 and carry out comprehensive control of the controller 2 overall. The CPU 14 corresponds to the image data processing means of the claims, and functions to convert the image data to drawing data and draw it in the image memory unit, in a process hereinafter referred to as the drawing process.

The program ROM 15 contains the control program used for processing and managing data inside the controller 2 and controlling peripheral modules. The font ROM 16 contains a variety of fonts used in printing.

The NVRAM 18 is, of course, nonvolatile memory, and so retains internal data even when power is cut. The NVRAM 18 stores mode instructions and the like from the control display unit 4.

The printer engine 3 corresponds to the printing means of the claims, and comprises a laser write unit that optically scans a photosensitive body (the interior of which is not shown in the drawing) using a laser beam modulated in response to a drawing signal, an image forming unit consisting of the photosensitive body and a variety of peripheral processing equipment pertinent thereto, a mechanism part that includes a sheet transport unit composed of a rollers such as a pair of resist rollers, and an engine driver that controls the mechanism part.

Depending on the commands and the drawing signals from the controller 2, the engine driver controls the sequencing of the image forming unit and the sheet transport unit and modulates the drawing signal to the laser write unit.

The above-described sheet transport unit, and comprises a plurality of supply trays that contain the transfer sheets and supplies them to the image forming unit and a plurality of exit trays that receive the printed transfer sheets. The supply tray and exit tray to be used are specifically selected by the control command from the controller 2.

It should be noted that although the configuration shown in FIG. 1 shows the printer engine 3 performing laser write printing, the printer engine 3 printing is not limited to such a system but may instead be an ink jet type or a thermal transfer type.

The display/control unit 4 comprises a control unit that sets the operating mode of the printer 1 and a display unit that displays, dynamically or successively, details concerning the operating status of the printer.

A description will now be given of the display of the operating status of the printer, with reference to FIGS. 2-8.

Figure 2:
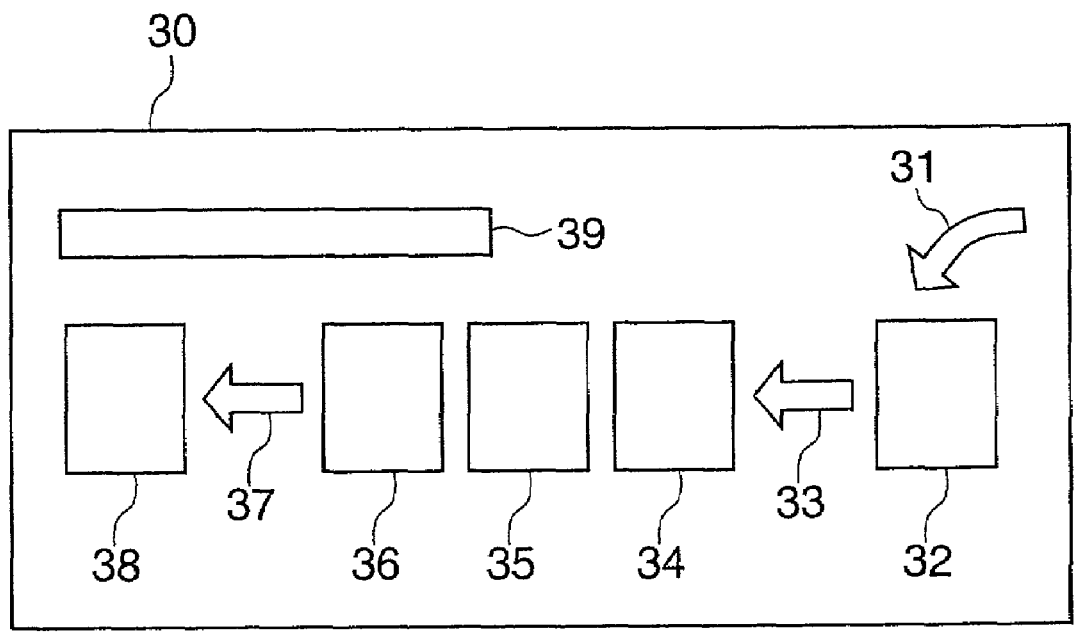
FIG. 2 is a diagram illustrating one possible arrangement of display components provided on a display portion of a display control part of the printer apparatus depicted in block diagram form in FIG. 1.
Figure 3:
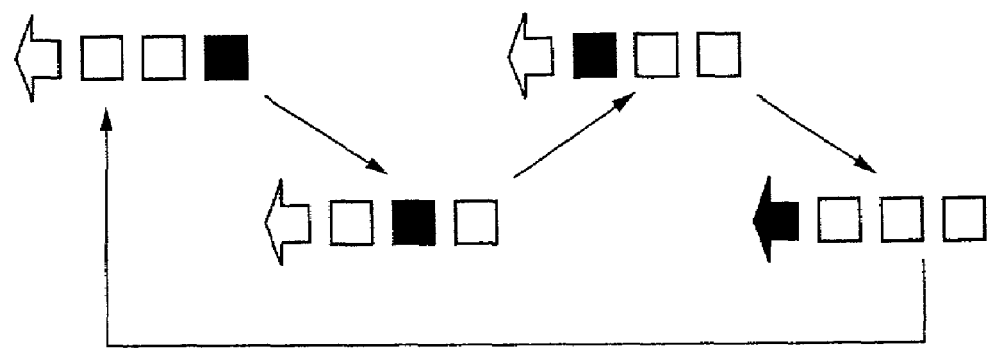
FIG. 3 is a diagram illustrating an indicator display for individual indicators of the display portion.
Figure 4:
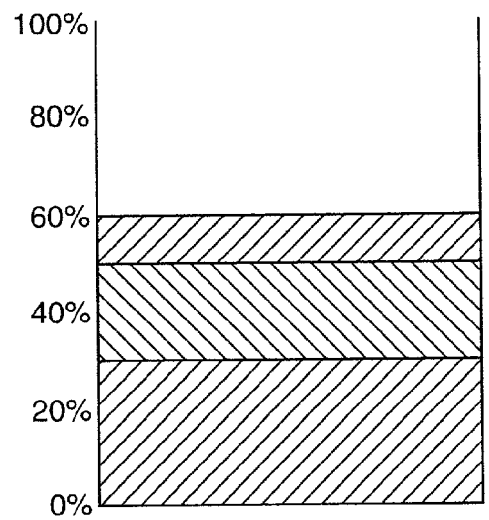
FIG. 4 is a diagram showing a sample spool data display of the display portion.
Figure 5:
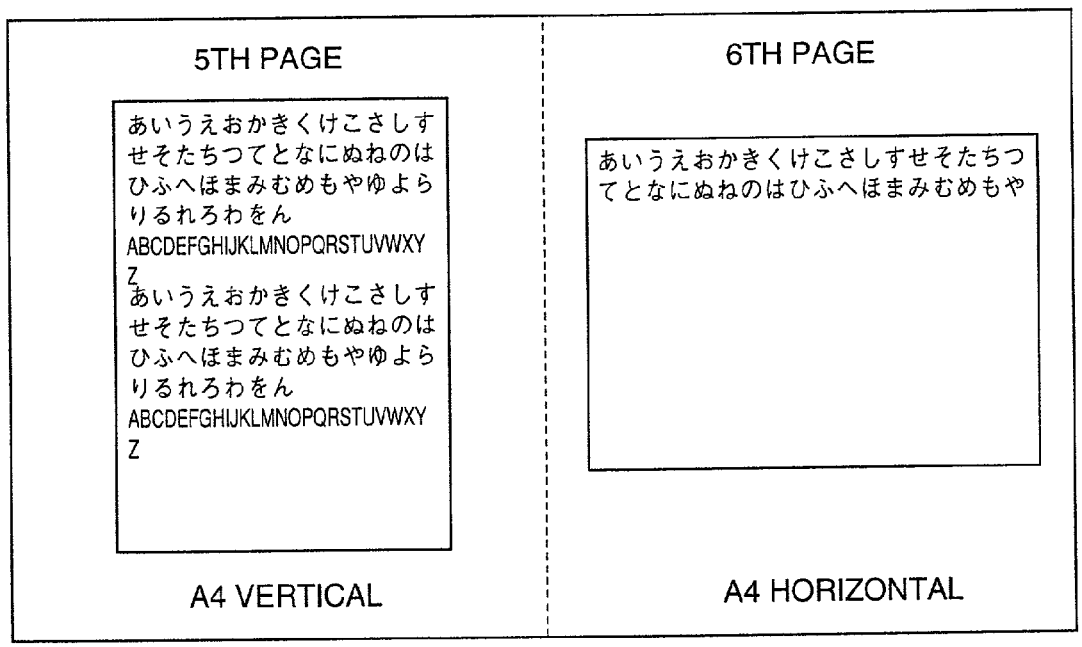
FIG. 5 is a diagram showing a sample drawing page data display of the display portion.
Figure 7:
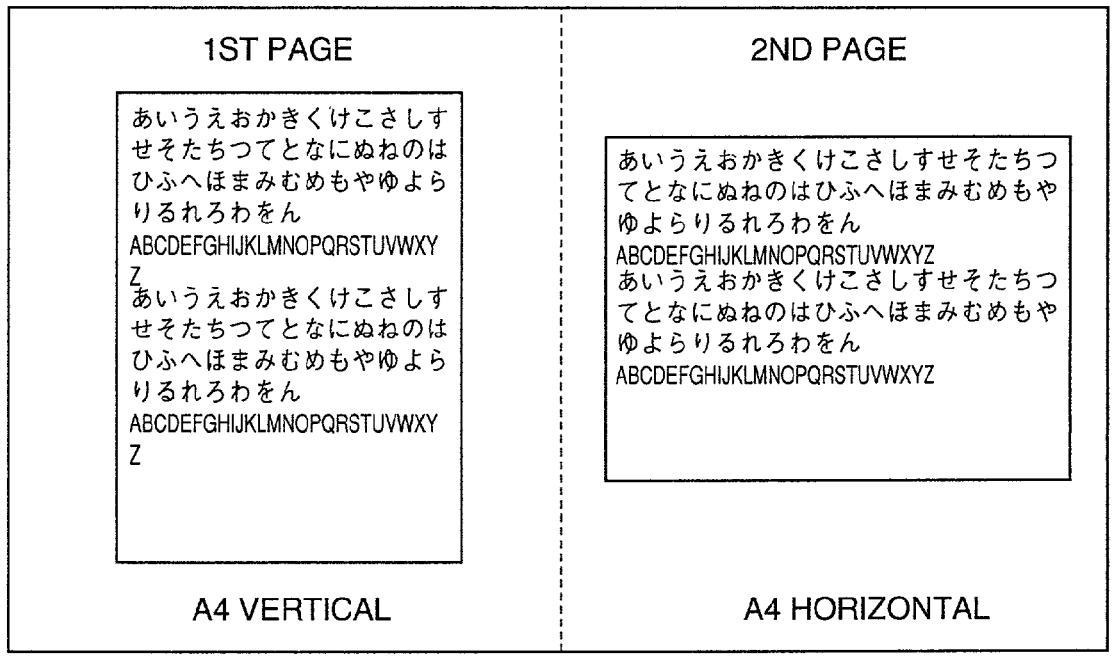
FIG. 7 is a diagram showing a sample print page data display of the display portion.
Figure 8:
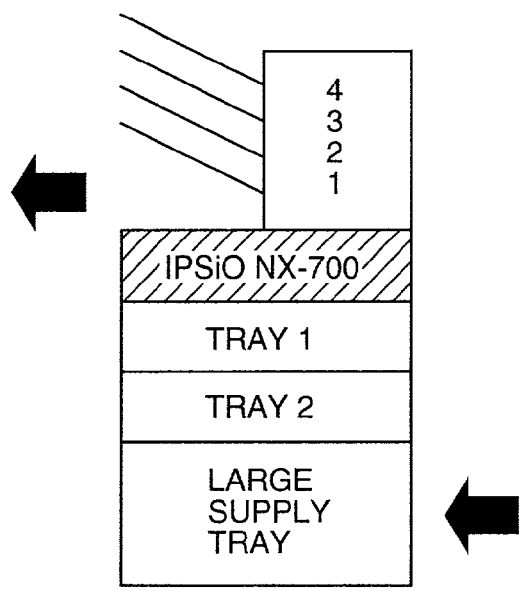
FIG. 8 is a sample supply tray data indicator display of the display portion.

FIG. 2 is a diagram illustrating one possible arrangement of display components provided on a display portion of a display control part of the printer apparatus depicted in block diagram form in FIG. 1. FIG. 3 is a diagram illustrating an indicator display for individual indicators of the display portion. FIG. 4 is a diagram showing a sample spool data display of the display portion. FIG. 5 is a diagram showing a sample drawing page data display of the display portion. FIG. 6 is a diagram showing a sample stored job data display of the display portion. FIG. 7 is a diagram showing a sample print page data display of the display portion. FIG. 8 is a sample supply tray data indicator display of the display portion.

A display unit 30 provided in the printer display/control unit 4 and shown in FIG. 2 corresponds to the display means of the claims, and may be a liquid crystal display (LCD). The display unit 30 comprises a variety of individual displays, such as a spooling indicator 31, a spool data display 32, a drawing indicator 33, a drawing page data display 34, a saved job data display 35, a printed page data display 36, a printing indicator 37, a supply/exit tray data indicator 38 and a message display 39.

Of these, the message display 39 is a means that displays error messages and the like. The message display 39 may be any well-known message display, and so a more detailed discussion thereof is omitted as unnecessary.

The spooling indicator 31 indicates when the printer 1 is in the process of receiving image data from the host apparatus 20, and corresponds to the spooling display component of the claims.

In a state in which image data is being received, segments that form arrows as shown in FIG. 3 flash in sequence so as to flow into the spool data display 32.

In a state in which image data is not being received, the segments that form the arrows remain blank.

It should be noted that although the arrows shown in FIG. 3 are straight, they may be curved (as shown in FIG. 2) or some other shape as well. With this display, the user can be aware that spooling is in progress.

The spool data display 32 corresponds to the spool data display component of the claims, and displays a total amount of as-yet-unprocessed (hereinafter unprocessed) image data that has not been drawn from among all image data received from the host apparatus 20, that is, image data that has not been converted to drawing data by the CPU 14.

The unprocessed data amount, as shown in FIG. 4, is displayed as a proportion of the maximum spoolable amount of data. Information concerning the unprocessed data amount may also be displayed separately for each print job, that is, on a per-print-job basis.

The unprocessed data amount increases as image data is received and decreases as drawing is carried out, so the unprocessed data amount is displayed successively while being monitored by the CPU 14. With this display, the user can ascertain the general extent to which spooling has progressed and obtain a general idea how much time it will take to complete the print job.

The drawing indicator 33 indicates that drawing is being executed by the CPU 14, and corresponds to the drawing display component of the claims. As with the spooling indicator 31, during drawing, individual segments that form arrows as shown in FIG. 3 flash in sequence so as to flow into the drawing page data display 34.

In a state in which drawing is not being carried out, all the segments that form the arrows go blank. With this display, the user can be aware that drawing is in progress.

The drawing page data display 34 corresponds to the drawing display component of the claims, and displays the contents of pages in the process of being drawn. As shown in FIG. 5, a page in the process of being drawn—if such exists—is displayed together with the immediately preceding page. The contents of each page are displayed together with the page number and page size, and a page being drawn is displayed in order and in real time from an already drawn area.

Preferably, the accuracy of the display should be real enough that the user has at least a general idea of the contents of each page. However, in cases in which there are limits to the resolution or the drive circuitry, it is acceptable to indicate the location of each character with a square dot or the like. After drawing has been completed, and after displaying for a certain time, that display is erased and a display indicating that drawing is not in progress is displayed. With this display, the user can get an idea of the extent to which spooling has progressed and obtain a general idea how much time it will take to completion.

The saved job data display 35 corresponds to the saved job display component of the claims, and displays a list of data on each job being processed by the printer 1. When the printer 1 receives a job from the host apparatus 20, the saved job data display 35 displays in the order of execution shown in FIG. 6. Each job is displayed together with its status, that is, whether receiving (spooling), waiting to be drawn, drawing, waiting to be printed, printing, number of pages, and the date and time when spooled.

This display is updated as the CPU 14 ascertains the state of progress on each job. The timing of the updates may be as required by updates to other displays. With the saved job data display 35, the user can get an overall idea of the state of progress on each print job.

The printed page data display 36 corresponds to the printed page display component of the claims, and displays a page in the process of being printed. As shown in FIG. 7, during execution of printing, the printed page data display 36 displays the page being printed together with the immediately succeeding page, if such exists. The contents of each page are displayed together with the page number and the page size.

Preferably, the accuracy of the display should be real enough that the user has at least a general idea of the contents of each page. However, in cases in which there are limits to the resolution or the drive circuitry, it is acceptable to indicate the location of each character with a square dot or the like. After printing has been completed, and after displaying for a certain time, that display is erased and a display indicating that printing is not in progress is displayed. With this display, the user can get an idea of the extent to which printing has progressed and obtain a general idea how much time it will take to completion.

The printing indicator 37 corresponds to the printing display component of the claims, and indicates that the printer engine 3 is in the process of executing a printing. As with the spooling indicator 31 during execution of a drawing, individual segments that form arrows as shown in FIG. 3 flash in sequence so as to flow into the supply/exit tray data indicator 38.

In a state in which image data is not being received, all the parts of the arrows remain blank. With the printing indicator 37, the user can know that a printing process is being executed.

The supply/exit tray data indicator 38 combines the supply tray display component of the claims that displays a selected supply tray and the exit tray display component of the claims that displays a selected exit tray. When printing individual pages, the supply/exit tray data indicator 38 indicates by arrows as shown in FIG. 8 which supply tray the transfer sheet to be printed is being supplied from and which exit tray the transfer sheet is being exited to.

In the illustration depicted in FIG. 8, the transfer sheet is supplied from a large supply tray and exited to a No. 1 exit tray.

In a case in which each page is being used interchangeably among a plurality of trays, it is acceptable to display the trays being used for each page. However, in terms of ease of reading, it is preferable to display all the trays that are used. With this supply/exit tray data indicator 38, the user can know from which supply tray the transfer sheet is being supplied and to which exit tray the transfer sheet is being exited.

It should be noted that although the display unit 30 described above consists of a single LCD on which individual indicators are provided, such an arrangement is for purposes of illustration only, and the present invention is not limited thereto. Thus, for example, it is acceptable to provide independent LCDs, or individual indicators and the supply/exit tray data indicator 38 described above may be composed of LEDs. Similarly, a display may be provided that is independent of the display/control unit 4, with individual displays and indicators provided thereon.

It should be noted that the particular arrangement and display methods of the individual displays and indicators described above are for illustrative purposes only, and represents but one of a number of possible arrangements and display methods. As can be appreciated by persons skilled in the art, the above-described arrangement and display methods can be changed as necessary for convenience of manufacture, ease of viewing and so forth, without departing from the scope and spirit of the present invention. Additionally, it is not necessary to provide all of the displays and indicators described above. Instead, is it sufficient to select the displays and indicators best suited to the purpose and to provide these in any arrangement that is convenient and useful.

A description will now be given of an operation of displaying data using the displays and indicators described above, with reference to FIGS. 9-11.

Figure 9:
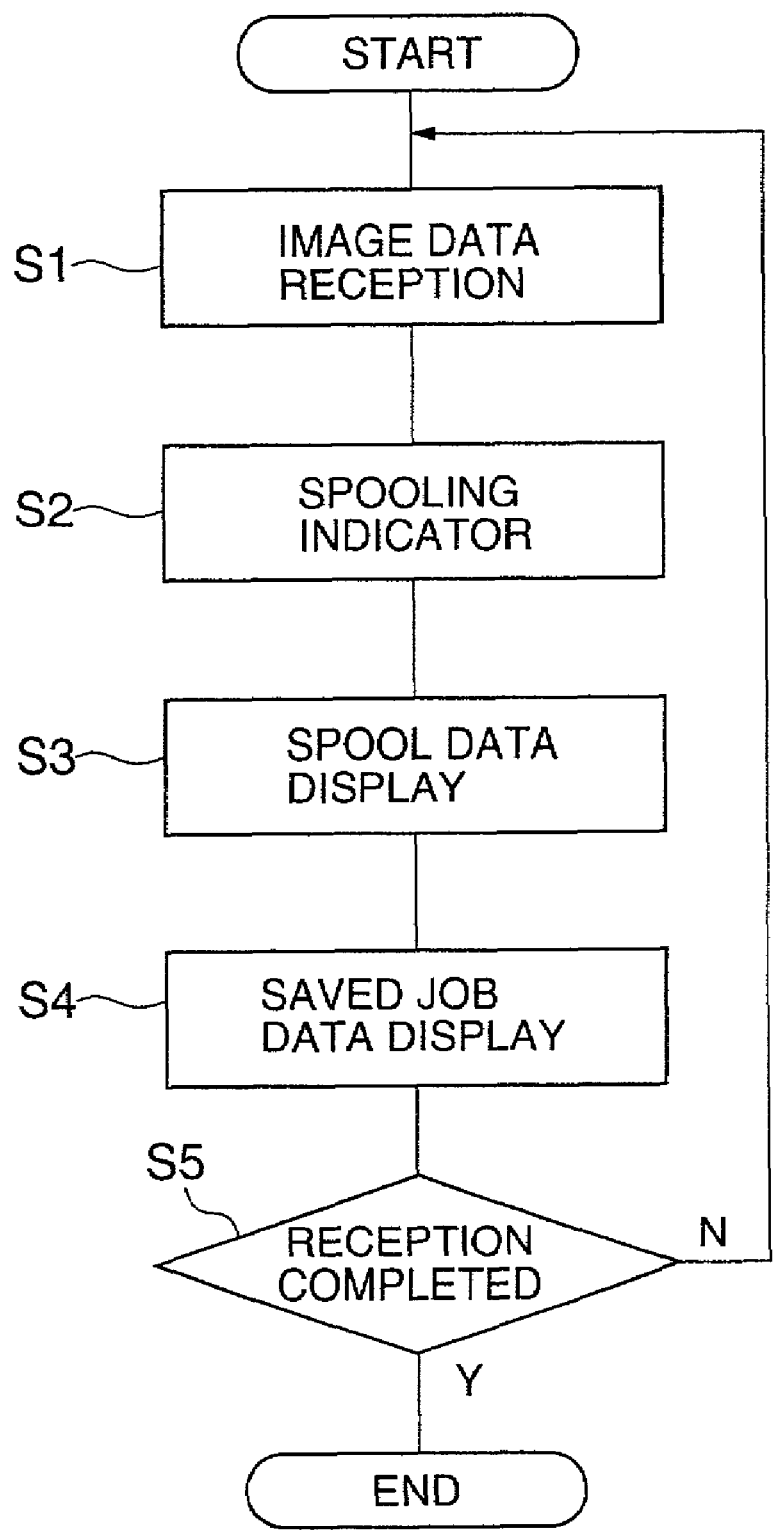
FIG. 9 is a flow chart showing an operation of the printing apparatus of the present invention when reading image data.
Figure 10:
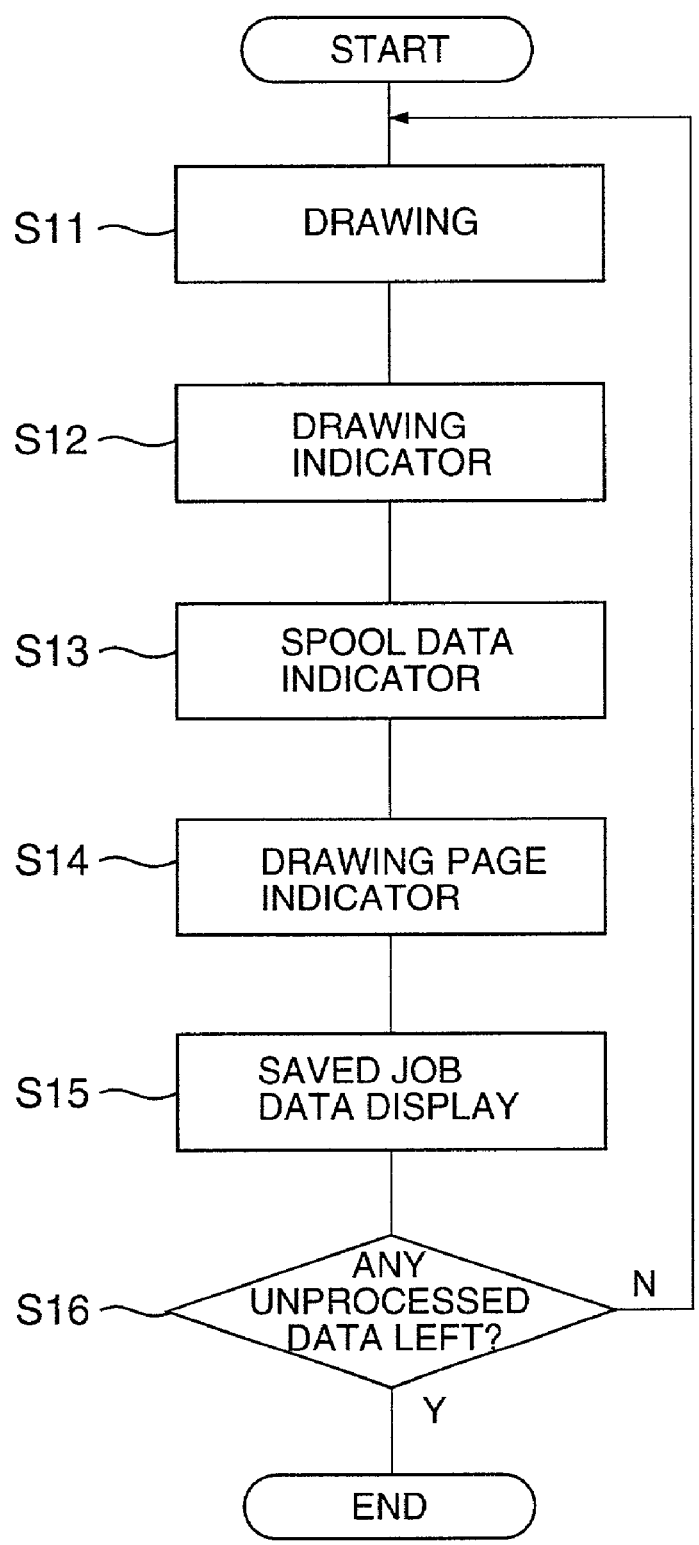
FIG. 10 is a flow chart showing an operation of the printing apparatus of the present invention during a drawing process.

FIG. 9 is a flow chart showing an operation of the printing apparatus of the present invention when reading image data. FIG. 10 is a flow chart showing an operation of the printing apparatus of the present invention during a drawing process. FIG. 11 is a flow chart showing an operation of the printing apparatus of the present invention during a print process.

When a request to receive image data from the host apparatus 20 arrives at the printer 1, the CPU 14 commences operations shown in the flow chart depicted in FIG. 9.

First, in a step S1, a predetermined amount of image data is received and spooled to the RAM 17 reception buffer, where the process proceeds to a step S2. At the step S2, the spooling indicator 31 indicates that image data is being received.

Continuing on to a step S3, the amount of data spooled to the reception buffer is checked and a corresponding spool data amount (unprocessed data amount) is displayed by the spool data display 32. The process proceeds further to a step S4, at which data indicating that a job is being saved is displayed by the saved job data display 35.

In a step S5, if job image data reception is not completed, then the process returns to the step S1 and reception continues. If, on the other hand, job image data reception is completed, then the process ends.

When spool data exists in the RAM 17 buffer, the CPU 14 commences operations depicted in the flow chart shown in FIG. 10 in order to perform drawing.

First, in a step S11 drawing is performed on a predetermined amount of spool data and written to image memory. The process then proceeds to a step S12, where the drawing indicator 33 displays an indication that drawing is in progress.

Then, the process proceeds to a step S13, the amount of unprocessed data spooled by the receiving buffer is checked and on that basis the amount of unprocessed data is displayed by the spool data display 32. This display is the same process as that carried out in step S3 of FIG. 9, but is carried out in order to update the display of the spool data display 32 because the drawing process also changes the amount of unprocessed data like the image data reception.

Next, the process proceeds to a step S14, where the drawn portion of a page in the process of being drawn is added to the drawing page data display 34. At this time, when the drawing of a page is completed the display of the preceding page is erased, the current page contents are displayed as the preceding page and the drawn portion of the succeeding page contents is displayed.

Next, the process proceeds to a step S15, where the saved job data display 35 indicates that a job is in the process of being drawn. Then, in a step S16, if any unprocessed data is left, the process returns to the step S11 and continues. If no unprocessed data remains, then the process terminates.

When more than a page of drawing data accumulates in the RAM 17 image memory, the CPU 14 commences the operations depicted in the flow chart of FIG. 11 in order to begin a print process.

In a step S21, the CPU 14 determines whether or not the supply tray and the exit tray have been set to automatic selection or not, and if so, in a step S22 selects the respective trays according to the size of the image data and such commands as sort, etc., and proceeds to a step S23. If the tray selection has not been set to automatic, then the trays have already been selected manually and the process proceeds to a step S23 on that basis. In a step S23, the supply/exit tray data indicator 38 displays the selected supply tray and exit tray.

Next, in a step S24 the printer engine 3 is engaged and a page worth of images is printed to the transfer sheet. Then, in a step S25, the printing indicator 37 displays an indication that printing is in progress.

The process then proceeds to a step S26, where the contents of a page in the process of being printed as well as the contents of a page scheduled to be printed next are displayed by the printed page data display 36. The process proceeds onward to a step S27, where the saved job data display 35 indicates that a job is being printed.

Thereafter, the process proceeds to a step S28. If any drawing data still remains in the image memory, then the process returns to step S21 and is repeated starting with tray selection. If no drawing data remains then the process terminates.

It should be noted that the processes depicted in FIGS. 9-11 can be executed in parallel.

By the above-described processes, this printer can display its operating status and the state of progress of each job in real time.

As can be appreciated by those skilled in the art, although the foregoing embodiments make use of an arrangement employing multiple supply trays and exit trays, the printing apparatus of the present invention is not limited to such an arrangement. Instead, one or both of either the supply tray or the exit tray may be provided, and in such a case there is, of course, no need to provide an indicator to show the one tray selected.

Further, as can be appreciated by those skilled in the art, the printing apparatus of the present invention is not limited to employment in printers but can be adapted to an array of devices, such as image formation apparatuses, that have a printing function.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-315974, filed on Oct. 16, 2000, the entire contents of each of which are hereby incorporated by reference.

What is claimed is:

1. A printing apparatus comprising:
   image data input means for receiving input data;
   image data processing means for processing the image data and drawing the image data in an image memory unit;
   printing means for forming an image on a transfer sheet using the image data drawn in the image memory unit; and
   display means for displaying, either dynamically or successively, which different process the image data is undergoing at any given moment, beginning with image data reception and ending with image data printing, the display means comprising a plurality of different individual distinct display components aligned in a successive progression from image data reception to data printing to successively indicate, for a single print job, the different processes from image data reception to data printing that have been executed for the single print job, and that are displayed simultaneously on a display portion.

2. The printing apparatus as claimed in claim 1, wherein the display means comprises as one of the plurality of display components a spooling display component that indicates dynamically that the image data is in the process of being received by the printing apparatus.

3. The printing apparatus as claimed in claim 1, wherein the display means comprises as one of the plurality of display components a drawing display component that indicates dynamically that the image data is in the process of being drawn in the image memory unit of the printing apparatus.

4. The printing apparatus as claimed in claim 1, wherein the display means comprises as one of the plurality of display components a printing display component that indicates dynamically that the image data is in the process of being printed by the printing apparatus.

5. The printing apparatus as claimed in claim 1, wherein the display means comprises as one of the plurality of display components a spool data display component that indicates successively an amount of unprocessed image data not yet drawn in the image memory unit from among that image data which has been received by the printing apparatus.

6. The printing apparatus as claimed in claim 5, wherein the display means comprises as one of the plurality of display components a spool data display component that displays the amount of unprocessed image data on a per-print-job basis.

7. The printing apparatus as claimed in claim 1, wherein the display means comprises as one of the plurality of display components a drawing page display component that displays pages of image data in the process of being drawn in the image memory component of the printing apparatus.

8. The printing apparatus as claimed in claim 1, wherein the display means comprises as one of the plurality of display components a printed page display component that displays pages of image data in the process of being printed by the printing apparatus.

9. The printing apparatus as claimed in claim 1, wherein the display means comprises as one of the plurality of display components a saved job display component that displays a list of print jobs stored in the image memory component of the printing apparatus.

10. The printing apparatus as claimed in claim 1, further comprising a selectable plurality of supply trays for containing transfer sheets ready to be sent to the printing means, wherein the display means comprises as one of the plurality of display components a supply tray display component that indicates a selected one of the supply trays.

11. The printing apparatus as claimed in claim 1, further comprising a selectable plurality of exit trays for receiving printed transfer sheets exited from the printing means, wherein the display means composers as one of the plurality of display components an exit tray display component that indicates a selected one of the exit trays.

12. The printing apparatus as claimed in claim 1, wherein the display means displays a graphic image message that indicates which process the image data is undergoing at any given moment, beginning with image data reception and ending with image data printing.

13. The printing apparatus as claimed in claim 1, wherein the display means displays a text message that indicates which process the image data is undergoing at any given moment, beginning with image data reception and ending with image data printing.

14. A printing apparatus comprising:
    an image data input unit receiving input data;

an image data processing unit processing the image data and drawing the image data in an image memory unit;

a printing unit forming an image on a transfer sheet using the image data drawn in the image memory unit; and a display unit displaying, either dynamically or successively, which different processes the image data is undergoing at any given moment, beginning with image data reception and ending with image data printing, the display unit comprising a plurality of different individual distinct display components aligned in a successive progression from image data reception to data printing to successively indicate, for a single print job, the different processes from image data reception to data printing that have been executed for the single print job, and that are displayed simultaneously on a display portion.

15. A printing apparatus comprising:

an image data input receiving input data;

an image data processing unit processing the image data and drawing the image data in an image memory unit;

a printing unit forming an image on a transfer sheet using the image data drawn in the image memory unit; and a display unit displaying, either dynamically or successively, which different processes the image data is undergoing at any given moment, beginning with image data reception and ending with image data printing, the display means comprising a plurality of different display components successively indicating the different processes from image data reception to data printing, and that are displayed simultaneously on a display portion, the display components simultaneously displayed including:

a spooling display component that indicates dynamically that the image data is in the process of being received by the printing apparatus, a drawing display component that indicates dynamically that the image data is in the process of being drawn in the image memory unit of the printing apparatus, a printing display component that indicates dynamically that the image data is in the process of being printed by the printing apparatus, a first spool data display component that indicates successively an amount of unprocessed image data not yet drawn in the image memory unit from among that image data which has been received by the printing apparatus, a second spool data display component that displays the amount of unprocessed image data on a per-print-job basis, a drawing page display component that displays pages of image data in the process of being drawn in the image memory component of the printing apparatus, a printed page display component that displays pages of image data in the process of being printed by the printing apparatus, and a saved job display component that displays a list of print jobs stored in the image memory component of the printing apparatus.

16. The printing apparatus as claimed in claim 15, further comprising a selectable plurality of supply trays for containing transfer sheets ready to be sent to the printing means, wherein the display means further comprises as one of the plurality of display components a supply tray display component that indicates a selected one of the supply trays.

17. The printing apparatus as claimed in claim 15, further comprising a selectable plurality of exit trays for receiving printed transfer sheets exited from the printing means, wherein the display means further comprises as one of the plurality of display components an exit tray display component that indicates a selected one of the exit trays.

18. The printing apparatus as claimed in claim 15, wherein the display means displays a graphic image message that indicates which process the image data is undergoing at any given moment, beginning with image data reception and ending with image data printing.

19. The printing apparatus as claimed in claim 15, wherein the display means displays a text message that indicates which process the image data is undergoing at any given moment, beginning with image data reception and ending with image data printing.

* * * * *